US010606224B2

(12) United States Patent
Rumble et al.

(10) Patent No.: US 10,606,224 B2
(45) Date of Patent: Mar. 31, 2020

(54) DEVICE ENABLED IDENTITY AUTHENTICATION

(71) Applicant: TYCO INTEGRATED SECURITY, LLC, Boca Raton, FL (US)

(72) Inventors: Terezinha Rumble, Jensen Beach, FL (US); George C. Grammer, West Palm Beach, FL (US)

(73) Assignee: TYCO INTEGRATED SECURITY, LLC, Boca Raton, FL (US)

( * ) Notice: Subject to any disclaimer, the term of this patent is extended or adjusted under 35 U.S.C. 154(b) by 775 days.

(21) Appl. No.: 15/252,314

(22) Filed: Aug. 31, 2016

(65) Prior Publication Data

US 2017/0076523 A1    Mar. 16, 2017

Related U.S. Application Data

(60) Provisional application No. 62/218,015, filed on Sep. 14, 2015.

(51) Int. Cl.
| | | |
|---|---|---|
| G05B 15/02 | (2006.01) | |
| G06Q 20/12 | (2012.01) | |
| G07C 9/00 | (2020.01) | |
| H04W 12/00 | (2009.01) | |

(52) U.S. Cl.
CPC .......... *G05B 15/02* (2013.01); *G06Q 20/127* (2013.01); *G07C 9/00103* (2013.01); *G07C 9/00111* (2013.01); *G07C 9/00071* (2013.01); *H04W 12/00516* (2019.01)

(58) Field of Classification Search
USPC ....................................................... 235/379
See application file for complete search history.

(56) References Cited

U.S. PATENT DOCUMENTS

| | | | |
|---|---|---|---|
| 9,589,402 B2 * | 3/2017 | Raina ................... | G07C 9/00111 |
| 10,229,548 B2 * | 3/2019 | Daniel-Wayman ......................... | |
| | | | G07C 9/00309 |
| 2003/0017871 A1 | 1/2003 | Urie et al. | |
| 2003/0120940 A1 | 6/2003 | Vataja | |
| 2005/0026596 A1 | 3/2005 | Markovitz | |
| 2008/0261560 A1 * | 10/2008 | Ruckart ............. | G07C 9/00103 |
| | | | 455/411 |
| 2009/0165092 A1 | 6/2009 | McNamara | |
| 2015/0221147 A1 | 8/2015 | Daniel-Wayman et al. | |
| 2016/0155112 A1 * | 6/2016 | Phillips ............ | G06K 19/06037 |
| | | | 235/379 |

OTHER PUBLICATIONS

International Search Report and Written Opinion, PCT/US16/50863.
European Search Report for EP Application No. 16847089.6, dated Apr. 16, 2019, 12 pages.

* cited by examiner

*Primary Examiner* — Michael G Lee
*Assistant Examiner* — David Tardif
(74) *Attorney, Agent, or Firm* — Foley & Lardner LLP

(57) ABSTRACT

Described is a flexible and customizable physical access control system that allows for a smart device to execute an authentication application that users subscribe to for various physical locations with pre-determined rule sets that correspond to registration information of the physical location's qualifications and rules sets. A user's smart device is used as a credential for large number of locations so long as that location is in the subscriber network.

20 Claims, 7 Drawing Sheets

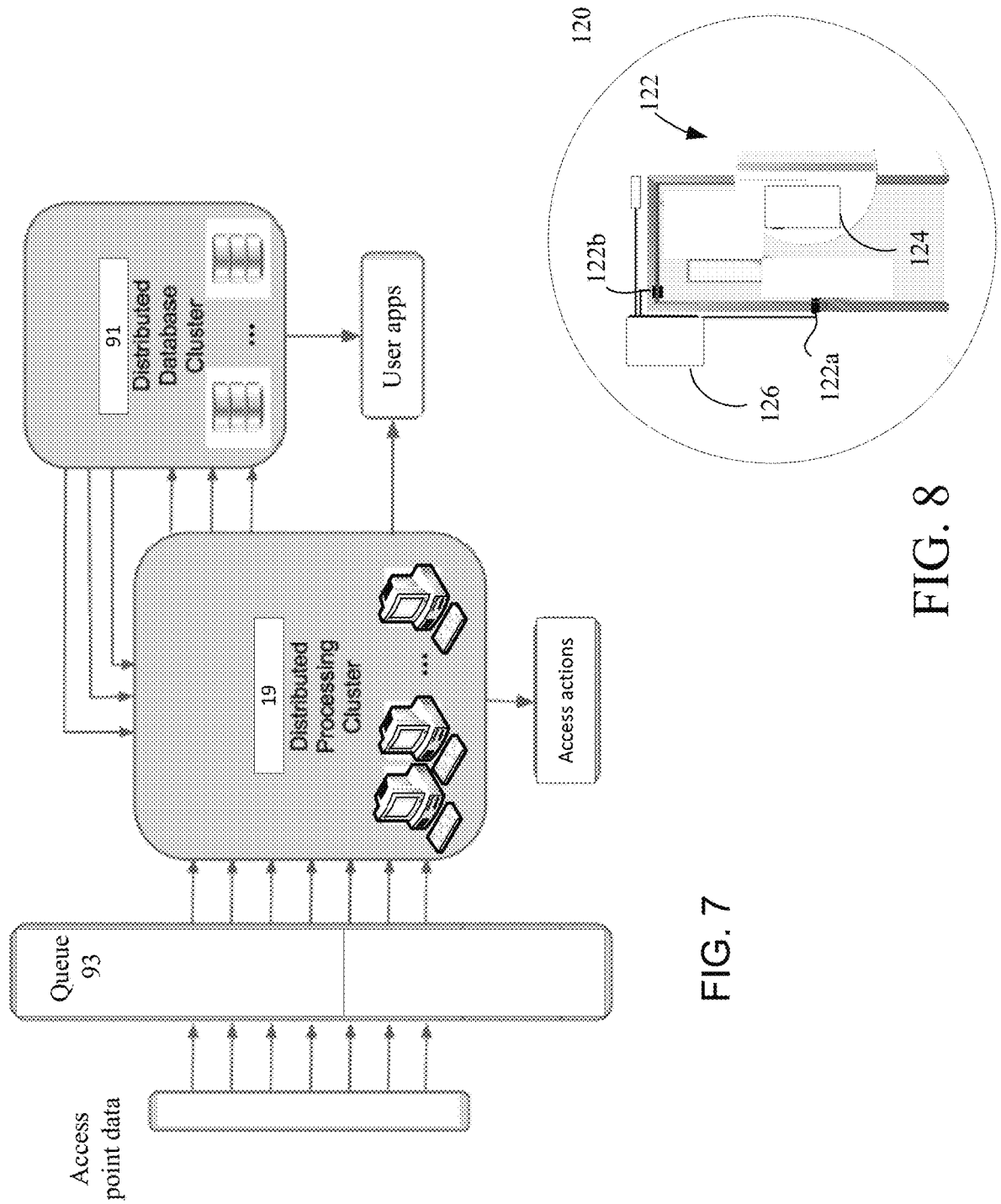

DEVICE ENABLED IDENTITY AUTHENTICATION

CLAIM OF PRIORITY

This application claims priority under 35 U.S.C. § 119(e) to provisional U.S. Patent Application 62/218,015, filed on Sep. 14, 2015, entitled: "DEVICE ENABLED IDENTITY AUTHENTICATION", the entire contents of which are hereby incorporated by reference.

DEVICE ENABLED IDENTITY AUTHENTICATION

Background

This specification relates generally to identity authentication systems and techniques.

Physical Access Control systems require dedicated hardware and software to manage user access to secure areas. Common examples of such physical access control systems include access controllers and card reader devices. Such physical access control systems also require "credentialing," that is, providing users with necessary credentials that are presented to such systems. Concomitant with credentialing is user management of such systems, e.g., management personnel required to add users, print and enroll credentials, and produce permission levels for users and groups within a facility, as well as regular maintenance of schedules and permissions rules by dedicated personnel. Generally, a credential issued to an individual is only useful for a specific facility or a limited set of facilities managed by that access control system.

SUMMARY

According to an aspect, a system for authentication/access control to a physical location includes at least one access control device at a first physical location, which access control device controls access to the physical location, a central, cloud-based cluster of computers that executes a subscription based access service application to manage access to the physical location through the one or more device readers at the first physical location on behalf of subscribing customers, and a user device to access the physical location through an application downloaded to the user device, which application is managed by the subscription service application.

According to an additional aspect, a system for managing authentication/access control to plural locations includes a central, cloud-based cluster of computers configured to execute a subscription based access service application to manage access to the physical locations through the one or more device readers on behalf of subscribing customers, receive a user request to manage a user's access to a particular physical location, retrieve specific instructions/rules that are unique for access to the physical location to send back to the identity authentication application, generate a user interface that embodies the specific instructions/rules and a request of a specific code from the user device, process data received from the user device according to the rules/instructions; and when authenticated send authentication credentials to the user device for storage on the user device.

Aspects also include methods and computer program products.

One or more of the above aspects may provide one or more of the following advantages.

The system provides a flexible and customizable physical access control system that allows a smart device to manage self-enabled and a self-service identity authentication, with a smart device executable identity authentication application and a server-based subscription service. The flexible and customizable physical access control system includes local smart device credential readers that are installed and controlled in the cloud. Users subscribe over a subscriber network to access physical locations based on pre-determined rule sets that match registration information with the physical location qualifications. A user's smart device is used as a credential for a large number of locations so long as that location is in the subscriber network. The network is partitioned by physical location for security.

Any two or more of the features described in this specification, including this summary section, may be combined to form implementations not specifically described herein.

All or part of the foregoing may be implemented as a computer program product comprised of instructions that are tangibly stored on one or more non-transitory machine-readable storage media/hardware devices, and which are executable on one or more processing devices. All or part of the foregoing may be implemented as an apparatus, method, or network system that may include one or more processing devices and memory to store executable instructions to implement functionality.

The details of one or more examples are set forth in the accompanying drawings and the description below. Further features, aspects, and advantages will become apparent from the description, the drawings, and the claims.

DESCRIPTION OF THE DRAWINGS

FIG. 7 is a block diagram of a server device.

FIG. 8 is a block diagram of an access point with art device readers and controllers.

DETAILED DESCRIPTION

Figure 1:
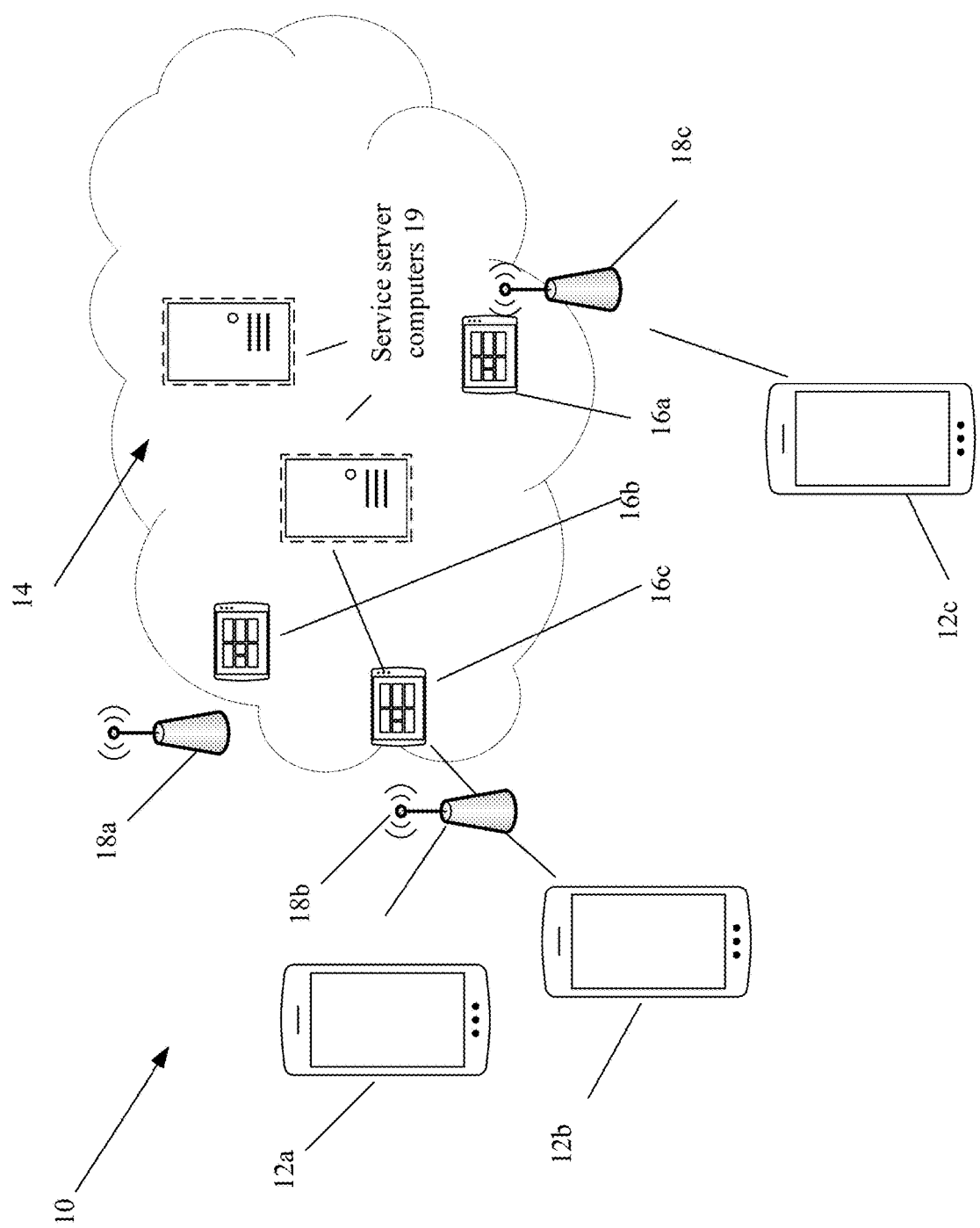
FIG. 1 is a block diagram of a device enabled identity authentication system.

Referring now to FIG. 1 a cloud-based Identity Authentication network 10 for authentication/access control (and in some implementations transaction initiation) to plural locations is shown. In this cloud-based Identity Authentication network 10, the physical locations (represented by card readers) can be varied, e.g., a residential house, access to any type of premises, e.g., commercial, industrial, buildings etc. (not shown) that are owned, controlled by third parties, i.e., customers or subscribers. The arrangement includes plural user devices 12a-12c (of which three are shown) in communication with a central service 14 that a cloud-based computing system that includes plural cloud based servers 19. The cloud-based Identity Authentication network 10 also includes plural device readers 16a-16c, of which three are shown, and which are disposed in different physical locations within a premises (or different physical premises) and which are controlled via the cloud-based central service 14. The cloud-based central service 14 manages access to the physical locations through the one or more device readers 16a-16c, on behalf of customers. In FIG. 1, each of the device readers are representative of a different physical location or premises for different subscribers. However, the device readers 16a-16c could be representative of different locations within a single premises.

A user accesses the physical locations via a user device (generally 12). Throughout this discussion, the user device 12a will be used in the explanation (unless otherwise noted). The user device 12a is a "smart," device, e.g., an Internet enabled device such as a "smart phone" (e.g., i-Phone® (Apple, Inc.) or Android® (Google, Inc.)) based phone to name a few examples. Other makes of "smart phones" and other portable, mobile devices including tablet computing devices could be used. Other form factors could be used at least for the access control including a smart card or other type of device that can be read. A smart phone will be used in the description for the user device 12a.

As used herein, a "smart phone" is a mobile, handheld device that includes a general purpose processor that executes with an advanced mobile operating system and downloaded and/or installed applications (common referred to as "Apps.)" A smart phone combines features of a cell phone with features of other devices to enable the smart phone to execute computer programs or Apps. In general, a smart phone includes a GPS navigation device (e.g., transceiver). Smart phones generally include a touchscreen user interface and cameras and have high-speed mobile broadband 4G LTE (or other cellular communication connection capabilities), Internet connection capabilities as well as, motion sensors, and mobile payment mechanisms.

The user devices access the service 14, via wireless access points 18a-18c, through an application that is downloaded to the user devices. In FIG. 1, two of the smart phone devices 12a and 12b are shown as seeking, in turn, access to the same smart device reader 16c over the same wireless access point 18b, whereas the smart phone user device 12c is shown accessing reader 16a over access point 18c. The other wireless access point 18a would likewise be involved with other (not shown) smart devices that would be seeking, in turn, access to the other smart device reader 16b over the wireless access point 18a, via the service.

Figure 2:
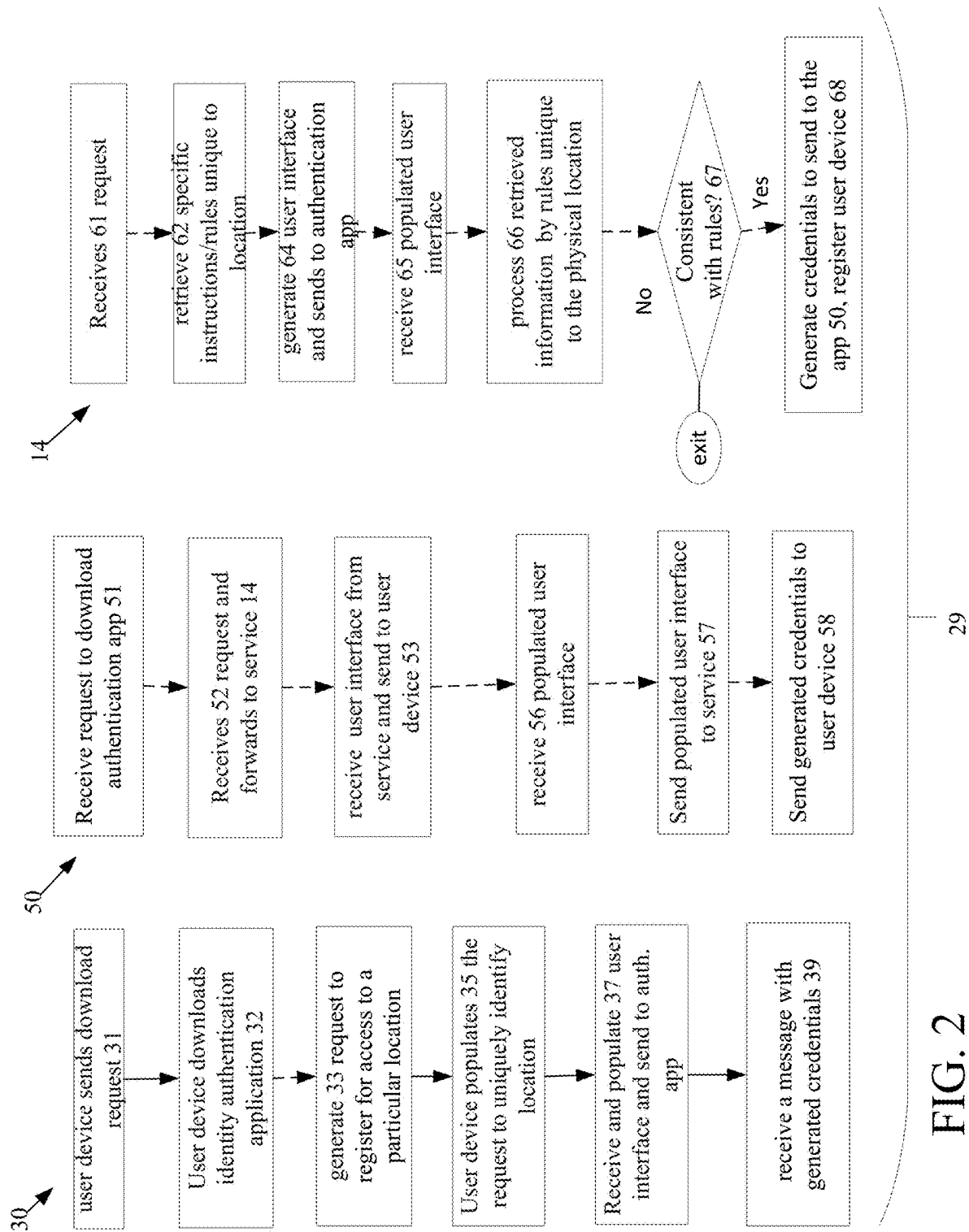
FIG. 2 is a flow chart of client actions and server actions for registration of a user, which are performed in the system of FIG. 1.

In general, while three wireless access points 18a-18c, three device readers 16a-16c and three use devices 12a-12c are shown, it is to be understood that many more of such items would exist in a typical implementation. In FIG. 1, the wireless access points 18a-18c and device readers 16a-16c are representative of different physical locations and different customer locations (subscriber locations) all of which are managed b the service 14. As used herein a smart device reader is a reader device (akin to a conventional card reader device), but which instead of reading a conventional card, reads information from the user's smart device executing a downloaded identity authentication application 30 (FIG. 2). Such information is information sufficient to recognize the device such as a device ID. The smart device readers 16a-16c in some implementations receive signals from the cloud based service 14 executing an access application to unlock an electronic lock or such action could be performed by an access controller that receives signals from the cloud based application.

Referring now to FIG. 2, a registration process 29 executed by an identity application 30 installed on user device 12a-12c in conjunction with a server identity authentication application 50 that executes on the cloud based computer servers 19 (FIG. 1) is shown. The registration process 29 is executed by the identity application 30 installed on user device 12a-12c, the server identity authentication application 50 and the service 14. In some implementations the server identity authentication application 50 can execute some or all of the features required by the service 14. Again using user device 12a as exemplary, the user sends 31 a request to download identity application 30. The server identity authentication application 50 receives 51 the download request and commences a download 52 of the identity authentication application 30 to the user device 12a from the cloud based computer servers 19. The identity application or "identity App" is downloaded 32 and executes on the user device 12a and interacts with the server identity authentication application 50.

The server identity authentication application 50 manages the user's authentication credentials, and optionally at this stage, the server identity authentication application 50 produces (not shown) a record (that is blank) for a request for access to a particular location. The server identity authentication application 50 sends (not shown) the request to the user device 12a. The identity application 30 has an optional capability of having the user device 12a read (not shown) the request and send with the request, biometric information of the user that is used by the server identity authentication application 50 for further authentication. Such biometric information can include fingerprints, iris scan, etc. For example, biometric information can reside in digital form in a file/data structure (and the like) stored on a storage medium either in the computing systems 19 that execute the server identity authentication application 50 and/or on the system at the local premises.

The server identity authentication application 50 is configured to register the user's smart phone 12a with each physical location that the user is authenticated to access.

The user device 12a via the identity application 30 on the user device 12a generates 33 a request to register for access to a particular location. The user device populates 35 the request data required by the request and with sufficient details that uniquely identifies the physical location for which managed access is requested. The user's location, as identified by the user's device 12a or cloud service application, is encrypted and is sent to server identity authentication application 50.

The server identity authentication application 50 receives 52 the request and forwards to the service 14. The central service 14 receives 61 the request and uses unique details/ rules required for the particular physical location including using biometric information (if required by the location), etc. for authentication. That is, the server identity authentication application 50 in response to the user input, sends the request to the service 14 for managing a user's access to a particular physical location.

Either the service 14 as shown (or server identity authentication application 50), in response to receiving the request retrieves 62 specific instructions/rules that are unique to the physical location to send back to the identity authentication application from an integrated set of databases (that hold information of the customers and users), as needed. Either the service 14 as shown (or server identity authentication application 50), generates 64 a user interface that embodies the specific instructions/rules and a request of a specific code (or codes) from the user device. The user interface is sent to the authentication application 50 that in turn forwards 53 to the user device 12a. The user device receives 37 the user interface and the user populates the user interface and sends back to the authentication application 50.

Either the service 14 as shown (or server identity authentication application 50), also sends an application that reads specific information pertaining to the user's device such as the user device's 12*a* unique device identification token commonly referred to as an "SSID." An SSID (or Service Set Identifier) is associated with wireless local area networks (IEEE 802.11 standard). Typically, client devices such as the user device 12*a* will use this to identify and join wireless networks. Other unique tokens or programs downloaded to the phone as part of the application could be used such as a unique code pushed to the application for a specific premises, or other such unique data entries, and other information that is required by the physical location. For example, the code can be a value that is manually read by the user or the unique device ID code is automatically read by the authentication app 30 and populated b the app 30 in a field in the user interface, etc.

The received user interface is populated by the user. The user is asked to input information specific information required of the location, e.g., user name, user location ID (e.g., an employee ID or a social security no., etc. anything that uniquely identifies the user and especially information about the user this is not generally known but which is known by the service (or accessible by the service) from the database/servers associated with the physical location. This user interface is sent back to the service 14, via the identity authentication application 50 populated with specific code(s) and/or specific information pertaining to the user's device 12*a* and user, which are required for the specific location for which the service was requested.

Upon sending this information by the identity authentication application 30, the server identity authentication application 50 receives 56 the populated user interface and sends the populated user interface or extracted data from the user interface to the service 14.

The service 14 (or server identity authentication application 50) receives 65 the populated user interface (or extracted data) and processes 66 the information received from the populated interface against retrieved specific instructions/rules that are unique to the physical location. The service 14 checks 67 for the existence of a specific code (or codes) unique to that physical location being present in the data returned from the user interface by the identity authentication application and compares information of the users, as received from the user interface with rules unique for that location. The codes can include specific pieces of encrypted data that uniquely authenticate the user device to be able to access the physical location (e.g., the specific reader of FIG. 1 or any of the device readers associated with a physical location, according to access privileges determined for the user.

If the information is correct, as required by the physical location, the user device is registered with the service for automatic authentication to the physical location. The service generates 68 credentials that will be placed on the user device and which will be transferred to a physical location reader device (or protocol for frictionless access control discussed below) to grant the user access to the physical location without the need of the user performing any action. The generated credentials are sent to the server identity authentication application 50 by the service 14 and the server identity authentication application 50 sends the credentials to the user device 12*a* and the appropriate devices readers. Otherwise, when the data are not consistent, the process 29 can exit or cause a retry.

Figure 3:
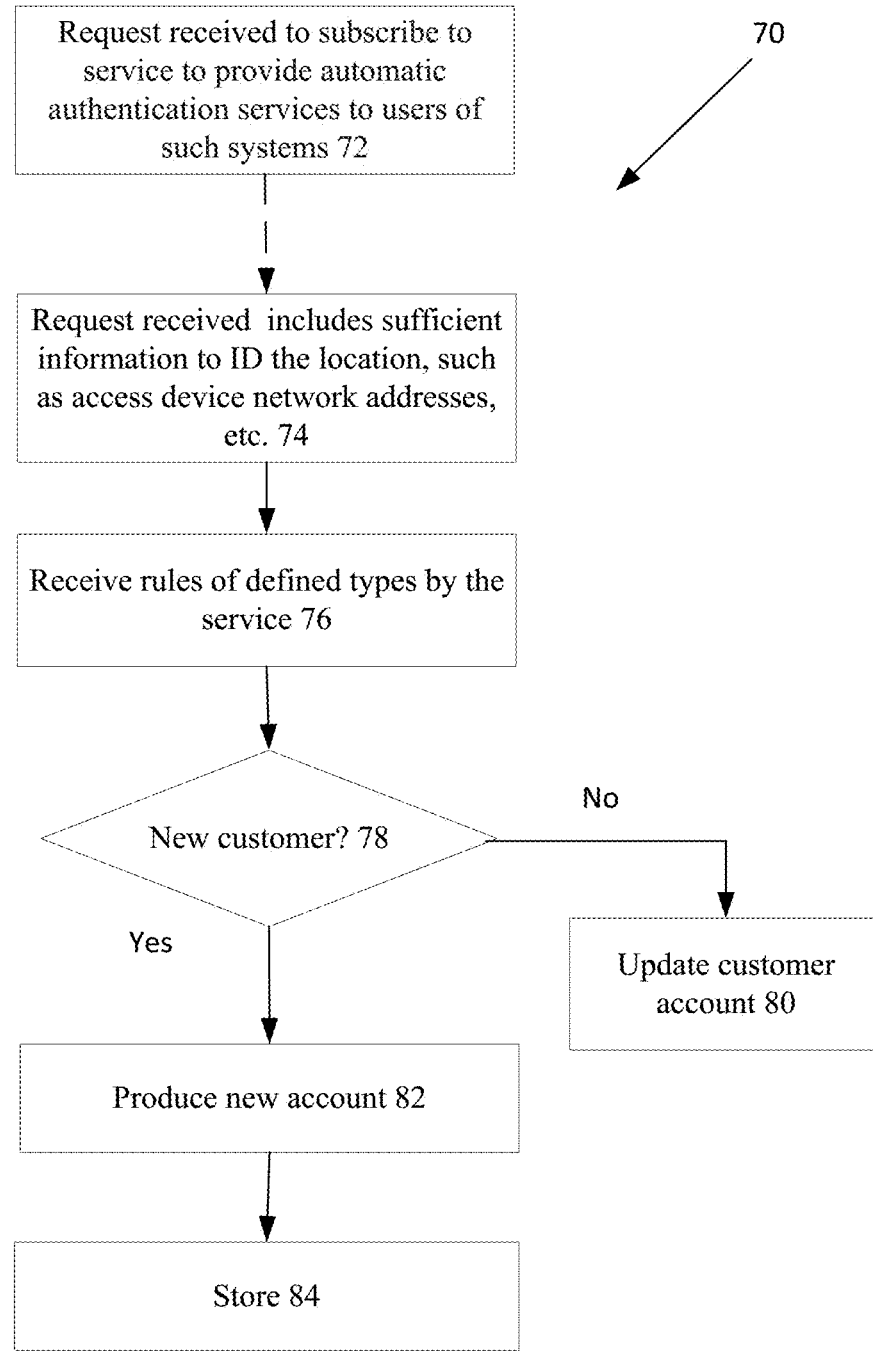
FIG. 3 is a flowchart showing a physical access subscription service process.

Referring now to FIG. 3, systems at various physical locations subscribe 70 to the service to provide automatic authentication services to users of such systems. Such requests are received 72 from authorized systems by the authentication service systems. The service receives 74 the request including sufficient information to identify the location, such as access device network addresses, etc. The service receives 76 in the request specific rules or other information required to authenticate a user. The service determines 78 from the request whether the request is from a new customer, if so the service finds and updates 80 an existing account. Otherwise, the service produces 82 a new account and stores 84 the account information.

The request could include a listing of users that can be authenticated. The rules for instance can include one or more ways that a user can access the physical location through the service and what the service will do and/or allow the user to do when to granting or not granting access. For example, rules can be of the following types:

---

Active Invite rule
    <send invite to user A>
    where invite is sent to a user device (device ID, device IP address, user e-mail address) associated with user A. E-mail would include an embedded link to download the authentication application.
    <list of actions that the service performs upon execution of the authentication application by the user device>
        <Send encrypted credentials>
        <register User Device A>
        <other>
    <actions that the service allows upon detection>
        <list of actions>
            Authenticated access to access devices <Network IP addresses or other access device ID's>
            <others>
Passive Invite rule
    <send invite to any user device>

--- where any user device is an device with a network IP address or a device ID associated with a user device that requests to download the authentication application.

---

<actions that the service performs upon execution of the authentication application>
    <Send encrypted credentials>
    <actions that the service allows upon detection>
        <Send list of actions>
            Access to access devices <Network IP addresses or other access device ID's>
            Promotional invitations
            <others>

---

Proactive User Push Rule
    <receive invite from user device A for authentication access to B location>
    where A user is an device network ID associated with a user device that requests to download the authentication application.

---

<actions that the service performs upon execution of the authentication application>
    <Send encrypted credentials>
    <actions that the service allows upon execution of the authentication application>
        <list of actions>
            Authenticated access to access devices <Network IP addresses or other access device ID's>
            <others>

---

Customers (subscribers) of the service push rules to the cloud servers 19 for storage in cloud databases via a URL link in a webpage to a website, a Quick Response Code™ type of matrix barcode (or two-dimensional barcode (QR Code) or a URL link in an e-mail, etc. Thus, systems at (or associated with) the physical location, send such subscription requests to the cloud-based identity authentication network. Servers 19 in the cloud-based identity authentication network process these subscriptiol requests and as necessary store information in cloud-based databases not shown) for use with the cloud-based identity authentication servers. The service provides cloud-based identity authentication for many customers where single instances of cloud-based identity authentication applications run on a server that serves multiple "tenants," i.e., groups of users that have the same view of the cloud-based identity authentication application. In a multi-tenant architecture, a software application is designed to provide each tenant with a specific share of the application instance including data, configuration, user management, tenant individual functionality and non-functional properties. Multi-tenancy application in contrast has separate software instances operate on behalf of different tenants.

Figure 4:
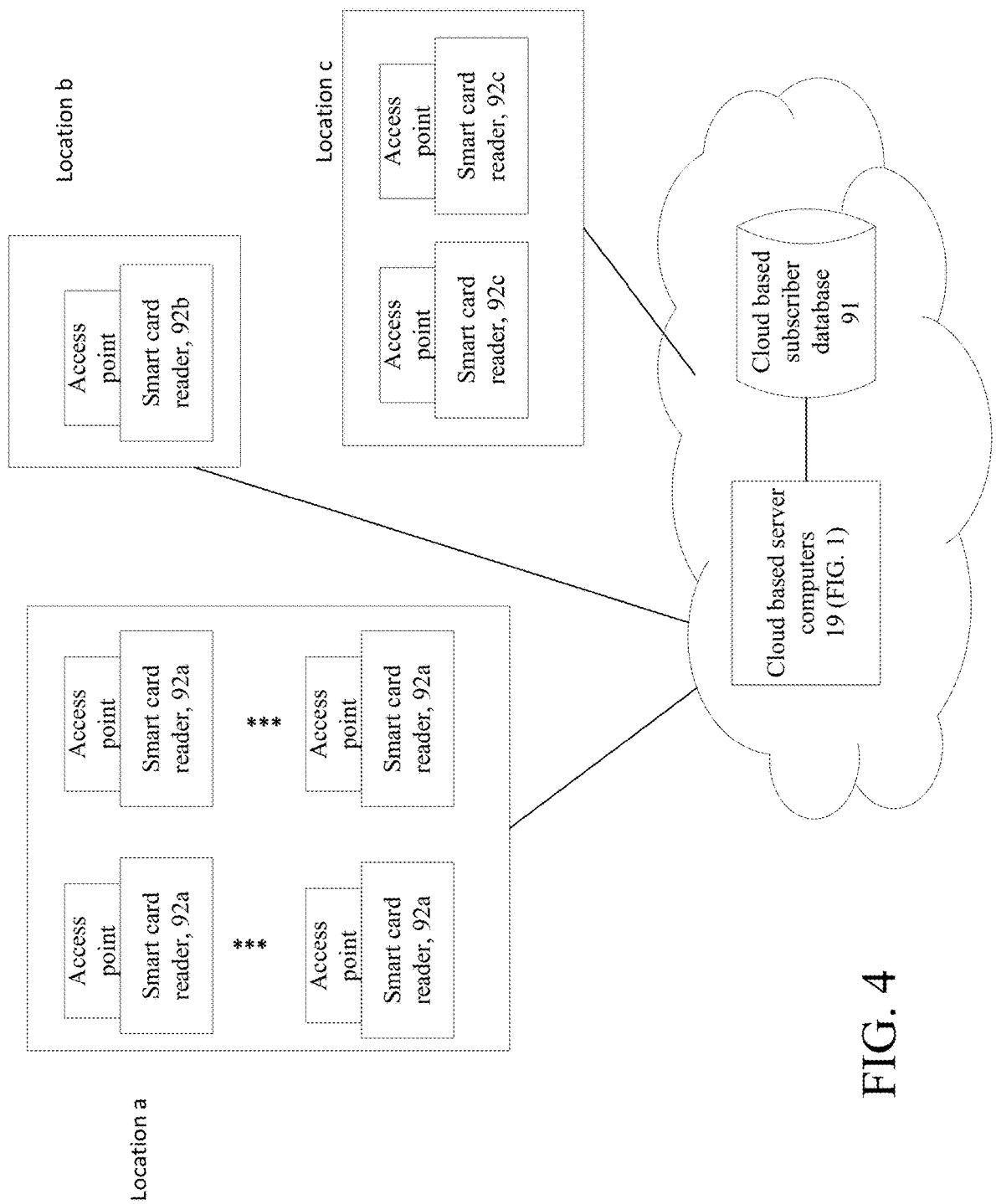
FIG. 4 is a block diagram of access points in communication with a cloud-based identity service.

Referring now to FIG. 4, wireless hardware devices, e.g., device readers 92a-92c (smart card readers) that control access devices (not shown) are controlled from the servers 19 in the cloud in multi-tenant manner that communicate via access points at the local physical premises (locations A through C, which may be geographically different locations of same or independent entities). That is, the servers 19 in the cloud process installed instances of devices using parameters, e.g., list of actions that accompany the above rules in real time upon detection of a user device 12a. Three different instances are shown.

One location (location a) has many instances of access points and card readers (generally 92a), which could be a building that a user works in or a group of buildings that the user can access, another location (location b) has one access point and card reader 92b which could be a user's home, whereas another location (location c) has two access points and card readers (generally 92c), which can represent a commercial establishment. The cloud based servers 19 receive signals from one of the various access points, via the card readers (92a, 92b, 92c) that detect the presence of the user with the user device 12a. The servers 19 process these signals and control the card reader via the access point based on the user's credentials, as retrieved from the database 91. (See also below for frictionless access control.)

Detection of a user device occurs in various manners. For example, Near Field Communication (NEC) or Wi-Fi or Bluetooth technologies can be used to indicate to the servers 19 that the mobile device 12a is in a specific area. In addition, smart device readers 92a-92c are used to detect the presence of mobile smart devices and the smart device reader having been presented with credentials that verify the mobile device as authenticated, can unlock a door, etc. Optionally, biometric readers can also be used for further authentication.

Access registration rules as described above can be of various types, including rules that require specific details. Access to the subscription network can be by way of active or passive invites and/or proactive user device push for download of the authentication program.

Various specific rules can be provided to control access. For example, from the same user device 12a executing the authentication application, the authentication application can provide instances where physical locations are no longer merely 'locked' or 'unlocked' but can be intelligently controlled with interaction between the subscription service and the authentication application. To point out a few examples of interaction with the subscription service, a limited free trial invite to local gym can be unlocked for a limited time; secure access can be provided to restricted areas that are unlocked with key registration information (name, SS #); access to warehouse shopping membership club purchased online (no customer service desk required); and check in at a local restaurant with the subscription service determining that the person is a frequent diner, assigning a premium table, and schedule-based location access within the workplace are some examples. Other examples are that an employee A is only allowed in a restricted area for his/her assigned shift. Thus rather than merely being used for access control in the context of an access control system to lock and unlock doors, the authentication application can be used in a transactional manner.

Identity Authentication Network

The cloud-based Identity Authentication network 10 is managed by a commercial entity and uses those types of products that exist presently to control access to premises, from cloud based servers instead of access control being on a local server. The features above, provide a novel application layer (30 and 50) that permits third parties, e.g., an owner of a residential house, or owners/occupants of commercial, industrial, buildings etc., i.e., customers, the ability to subscribe to this service. That is, with the Identity Authentication network 50 subscribers provide cloud-based identity Authentication network 50 with the protocols needed for access control and/or transactional control of subscriber premises, and the cloud-based Identity Authentication network 10, via the cloud based servers 19 authenticate the subscriber's authorized users. This in turn provides users of one or more of these premises the ability to register with the cloud-based Identity Authentication network 10 for access to multiple ones of such authenticated accesses from the particular mobile device generally 12.

The cloud-based Identity Authentication network 10 uses encryption extensively, between communications between the mobile device 12 and cloud server computers 19. For example, the SSID, the inputted data, the user's specific location, the authentication rules for each location and the user's specific premise subscriptions would all be encrypted at least during transmission between devices/systems, and would preferable be stored in encrypted form on such devices/services, as appropriate.

Figure 5:
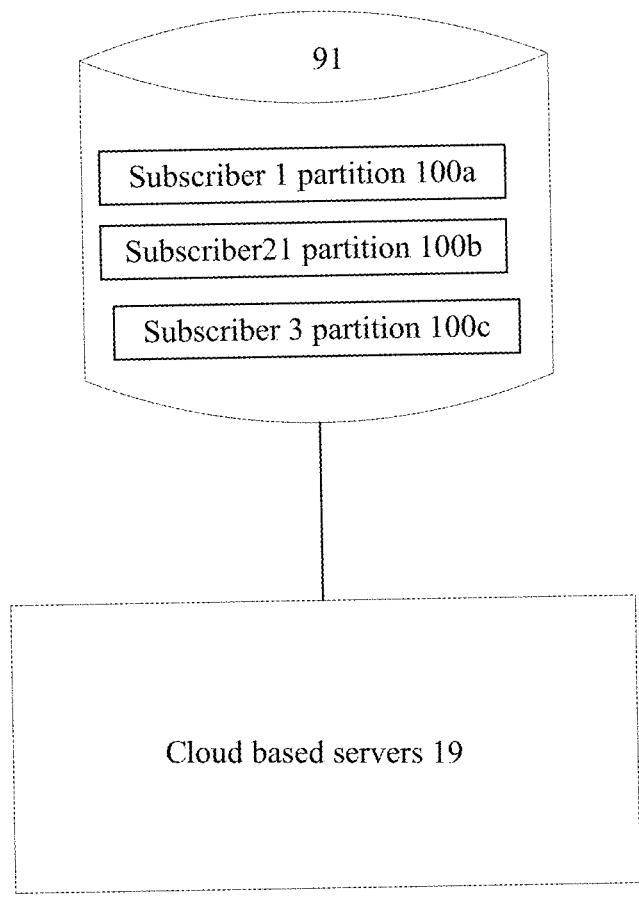
FIG. 5 is block diagram of cloud based customer partitions.

Referring now to FIG. 5, the cloud-based Identity Authentication network 10 would also provide secure partitions 100a-100c in the cloud-based database 91 for the rule sets, listings, etc. of each customer subscriber account (that is, third party owners/occupants residential, commercial, industrial, buildings, etc. that subscribe to the service) that may be accessed by servers 19. The secure partitions 100a-100c can be on a location basis or a customer-subscriber basis. These secure partitions 100a-100c insure that customer data and rules are partitioned away from others, so that a customer can only access its own rules and/or data.

In an example network topology, communication links are direct (single-hop network layer) connections between devices. A formal networking layer can use a series of these links, together with appropriate routing technology, to send messages (fragmented or unfragmented) from one device to another, over a physical distance. In other network topologies, each link may represent two or more hops and/or the configuration may be different.

Figure 6A:
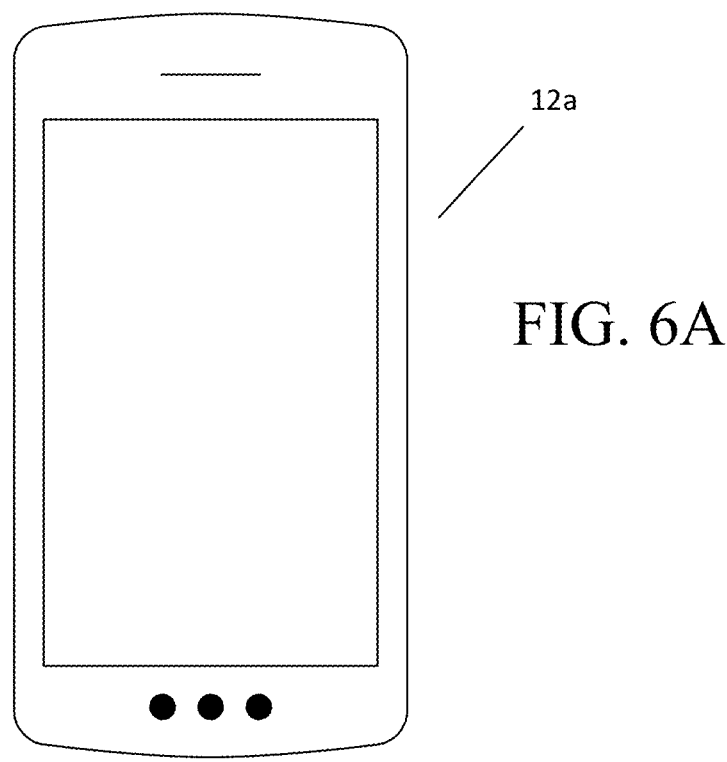
FIGS. 6A, 6B are block diagrams of a user device.
Figure 6B:
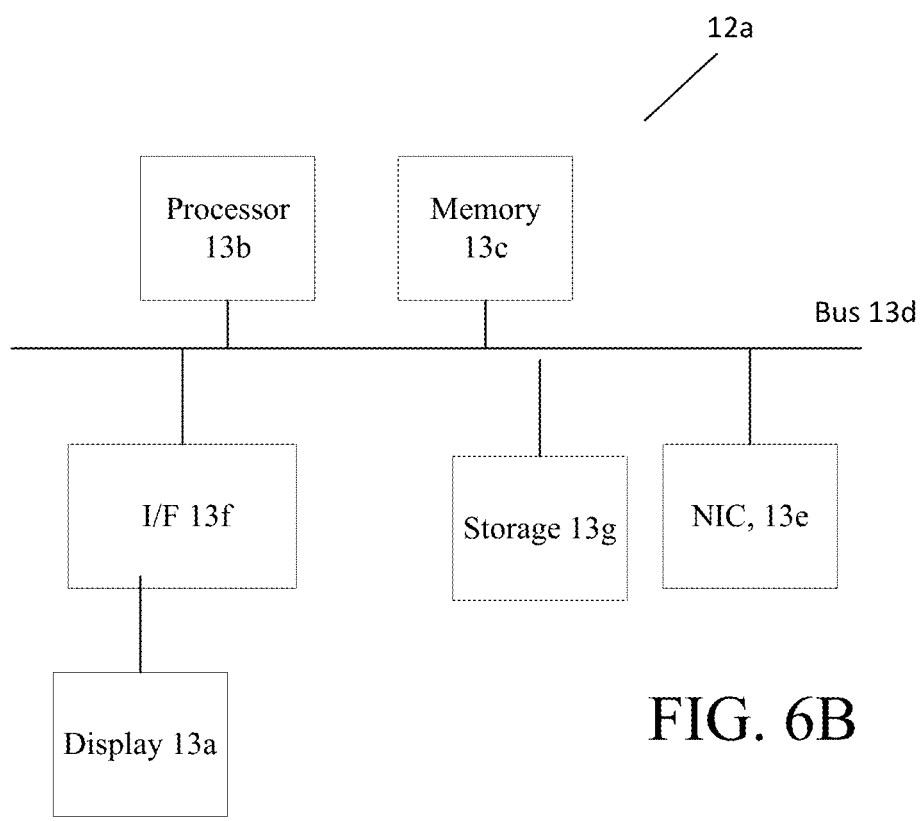

Referring now to FIGS. 6A-6B, atypical mobile device 12a is shown to include display 13a, a processor 13b, memory 13c operatively coupled to the processor 13b, via a bus 13d, with a network interface card 13e and other interfaces 13*f* such as display interface to connect to the display, and storage 13*g*. Other interfaces can be provided.

The cloud-based Identity Authentication network 10 can operate with frictionless control of the hardware devices that control access such as controllers 94*a*-94*c*, with corresponding access points at the local physical premises. The access points send location data to a distributed queue that in turn supplies such data to the distributed processing cluster 19. The controllers 94*a*-94*c* and are controlled from the servers 19 in the cloud in the multi-tenant manner, as discussed above. However, the presence of a user at any particular location is determined not from the readers (as in FIG. 4) or the like but rather "frictionlessly." That is, the servers 19 in the cloud process registered instances of devices 12*a* using the parameters, e.g., list of actions that accompanied the above rules in real time upon detection of a user device 12*a* (from the database cluster 91). The cloud service tracks the wireless network service set identifier (SSID) of the user's mobile device, 12*a* via any of several different technologies or combinations of technologies, such as global positioning systems (GPS) for outdoor tracking and within a premises, the cloud service determines the wireless network service set identifier (SSID) and tracks that SSID for a user device through GPS, as well as Bluetooth, NFC, UHF or Wi-Fi triangulation to read the mobile device's 12*a* mobile credential. By reading the mobile credential in this manner the cloud service knows the location of the user device 12*a*. The cloud service determines from that location the location of an access control device, etc., and at a threshold distance from that access control device (or other device), the cloud sends signals to the access control device (or other device) to activate the device 12*a*, etc. according to rules established in the service by the subscriber.

The cloud-based Identity Authentication network 10 with or without frictionless access control provides a flexible and customizable physical access subscription service for many independent locations, which access is managed by a user with a user device 12*a*. End users use their smart device 12*a* (e.g., phone, tablet, etc. with the download App (that can be provided free of charge) to enable self-service registration to physical location(s). For the subscription provider, a mobile identity cloud architecture is provided that has secure customer partitions, with end user device security, and which controls smart reader hardware. For subscribing customers, (premises owners) they subscribe to the mobile identity service, have setup of smart device readers, implement access registration rules and customized integrations.

Referring to FIG. 7, an exemplary view of the cloud-based Identity Authentication network 10 is shown. The access points send location data to a distributed queue 93 that in turn supplies such data to the distributed processing cluster 19. The servers 19 process registered instances of devices 12*a* using the parameters, e.g., list of actions that accompanied the above rules in real time upon detection of a user device 12*a* (from the database cluster 91).

In this example, the queue cluster comprises multiple network devices that cooperate to communicate with end nodes of a network (e.g., access points of FIG. 1) and to store information from the access points in memory (e.g., one or more hardware storage devices). In operation, communication, represented by messages, comes from access points that have data captured from mobile devices that seek authentication at the access points. The communications are stored in one or more devices in the queue cluster. In this example, every node within the queue cluster presents a RESTful API to the outside world. A purpose of the RESTful API is to decouple, and to allow, any user to communicate with the system in a well-defined interface, avoiding, for instance, a requirement that the user or end device have knowledge the native language of the queue cluster. This cluster or any cluster includes appropriate communication channels between the nodes of the clusters.

Referring now to FIG. 8, a portion of facility 120 with access control 122 is shown. In this illustrative example, the facility 120 includes a secured room and an external entryway. Room has a doorway and has associated therein an access controller 126 and an ingress smart device reader 124. The room could have two smart device readers, an ingress smart device reader and an egress smart device reader. The view as shown also includes exemplary door locks 122*a*, 122*b* controlled by the access controller 16, which is controlled by the server 19 (FIG. 1). In some implementations the smart device readers can include circuitry to control the door locks.

A distributed parallel processing cluster (system) comprises multiple network devices that cooperate to perform one or more operations on the information from the queue cluster. In this example, this system does not present a single point of failure and all the nodes play the same, or a similar, role. The distributed parallel processing cluster (system) operates on a set of rules and the data received. The cluster accesses data from a database, in an example a distributed database cluster (system) having no single point of failure. The database cluster comprises multiple network devices that cooperate to provide storage for use by the processing cluster. For example, processed data can be stored in the database cluster, data can be retrieved from the database cluster for processing, and so forth. The three cluster approach described above forms an example basic distributed architecture.

Example distributed network topology may include or be part of a self-organizing network, such as a wireless mesh network. In some implementations, all of distributed network topology is implemented using wireless mesh technology. In some implementations, only part of distributed network topology is implemented using wireless mesh technology.

The functionality of one or more gateways and/or others of the network devices described above may be distributed among various devices, as described below.

In this regard, in a networking context, the term "cloud" may include a variety of services and applications that reside outside of hardware that is managed or controlled by a user. There are several scenarios that illustrate this concept, such as a website where users access web applications, or an online library where a database resides in a centralized or distributed external location rather than on the user's computers. The traditional architecture for this paradigm is usually a user interface (UT), where the external users connect, via an application program interface (API), to some type of database to manage the information. The user interface submits requests via an API to a cloud server. Typically, each of these requests is processed by modular programs called "agents" or "workers" that run on the cloud-based server, and not in the users' computer. These agents may execute tasks assigned by the users, for example, to query the database or to execute a complex operation involving data and user input.

Memory stores program instructions and data used b processor of the devices. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Program instructions stored in the memory, along with configuration data may control overall operation of the panel.

The monitoring server includes one or more processing devices microprocessors), a network interface and a memory (all not illustrated). The monitoring server may physically take the form of a rack mounted card and may be in communication with one or more operator terminals (not shown) An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A system of access control for a physical location, the system comprising:
   at least one access control device at the physical location, wherein the at least one access control device controls access to the physical location based on an access credential of a user device of a user;
   a central cloud-based cluster of computers that execute a subscription based access service application to manage access to the physical location through the at least one access control device at the physical location on behalf of one or more subscribing customers by registering the user with the physical location and deploying the access credential to the user device and the at least one access control device in response to registering the user with the physical location; and the user device configured to authenticate directly with the at least one access control device via an application downloaded to the user device at a plurality of different times by wirelessly transmitting the access credential to the at least one access control device at each of the plurality of different times, wherein the application stores the access credential and the application is managed by the subscription based service application.

2. The system of claim 1, wherein the user device is configured to:

access biometric information from biometric readers; and send the biometric information to the central cloud-based cluster of computers to authenticate the user.

3. The system of claim 1, wherein the at least one access control device is a card readers coupled to the central cloud-based cluster of computers.

4. The system of claim 1, wherein the user device is configured to store authentication credentials for a plurality of physical locations.

5. The system of claim 1, wherein the central cloud-based cluster of computers execute the subscription based access service application causing the central cloud-based cluster of computers to receive, from the user device, information pertaining to the user device for registration with the physical location, the information including a code captured by the application of the user device.

6. The system of claim 1, wherein the central cloud-based cluster of computers execute the subscription based access service application causing the central cloud-based cluster of computers to receive a user request to manage access to the physical location.

7. The system of claim 6, wherein the user request is a download request to download an identity authentication application, wherein the download request includes details that identify the physical location.

8. The system of claim 1, wherein the central cloud-based cluster of computers execute the subscription based access service application causing the central cloud-based cluster of computers to retrieve rules associated with the physical location;

wherein registering the user with the physical location comprises registering the user based on the rules.

9. The system of claim 8, wherein the central cloud-based cluster of computers execute the subscription based access service application causing the central cloud-based cluster of computers to retrieve the rules from an integrated set of databases configured to store information of the one or more subscribing customers and users.

10. The system of claim 8, wherein the central cloud-based cluster of computers execute the subscription based access service application causing the central cloud-based cluster of computers to:

generate a user interface that includes a request for one or more codes from the user device, wherein the request is based on the rules; and process data received from the user device according to the rules to register the user with the physical location.

11. A system for managing access control for a physical location, the system comprising:

a central cloud-based cluster of computers configured to:

execute a subscription based access service application to manage access to the physical location through at least one access control device on behalf of one or more subscribing customers, wherein the at least one access control device controls access to the physical location based on an access credential of a user device of a user;

receive a user request to manage access to the physical location;

retrieve rules associated with the physical location;

generate a user interface based on the rules, wherein the user interface includes a request for one or more codes from the user device;

process data received from the user device according to the rules to register the user with the physical location; and deploy the access credential to the user device and the at least one access control device in response to registering the user with the physical location, wherein the user device stores the access credential and authenticates with the at least one access control device at a plurality of different times by wirelessly transmitting the access credential to the at least one access control device at each of the plurality of different times.

12. The system of claim 11, wherein the user request is a download request to download an identity authentication application, wherein the download request includes details that identify the physical location.

13. The system of claim 11, wherein the central cloud-based cluster of computers is configured to retrieve the rules from an integrated set of databases configured to store information of the one or more subscribing customers and users.

14. The system of claim 11, wherein an authentication application of the user device captures specific information pertaining to the user device that is required by the physical location, the specific information including a code value.

15. A method of access control for a physical location, the method comprising:

executing, by one or more computer systems, a subscription based access service application to manage access to the physical location through at least one access control device on behalf of one or more subscribing customers, wherein the at least one access control device controls access to the physical location based on an access credential of a user device of a user;

receiving, by the one or more computer systems, a user request to manage access to the physical location;

retrieving, by the one or more computer systems, rules associated with the physical location;

generating, by the one or more computer systems, a user interface based on the rules, wherein the user interface includes a request for one or more codes from the user device;

processing, by the one or more computer systems, data received from the user device according to the rules to register the user with the physical location; and deploying, by the one or more computer systems, the access credential to the user device and the at least one access control device in response to registering the user with the physical location, wherein the user device stores the access credential and authenticates with the at least one access control device at a plurality of different times by wirelessly transmitting the access credential to the at least one access control device at each of the plurality of different times.

16. The method of claim 15, wherein the user request is a download request to download an identity authentication application, wherein the download request includes details that identify the physical location.

17. The method of claim 15, wherein retrieving, by the one or more computer systems, the rules comprises retrieving the rules from an integrated set of databases configured to store information of the one or more subscribing customers and users.

18. The method of claim 15, wherein an authentication application of the user device captures specific information pertaining to the user device that is required by the physical location, the specific information including a code value.

19. The method of claim 15, wherein the at least one access control device is a card reader coupled to the central cloud-based cluster of computers.

20. The method of claim 19, further comprising:
   accessing, by the user device, biometric information from biometric readers; and
   sending, by the user device, the biometric information to the central cloud-based cluster of computers to authenticate the user.

\* \* \* \* \*